United States Patent
Hilmersson et al.

(10) Patent No.: US 10,738,915 B2
(45) Date of Patent: Aug. 11, 2020

(54) THIN WALL PIPE AND MANUFACTURING PROCESS

(71) Applicant: AUTOTUBE AKTIEBOLAG, Varbeg (SE)

(72) Inventors: Jan-Inge Hilmersson, Horred (SE); Tor Magnus Nilsen, Västra Frölunda (SE)

(73) Assignee: AKWEL SWEDEN AB, Varberg (SE)

( * ) Notice: Subject to any disclaimer, the term of this patent is extended or adjusted under 35 U.S.C. 154(b) by 0 days.

(21) Appl. No.: 16/048,678

(22) Filed: Jul. 30, 2018

(65) Prior Publication Data
US 2019/0032818 A1    Jan. 31, 2019

(30) Foreign Application Priority Data

Jul. 28, 2017    (FR) ...................................... 17 57183

(51) Int. Cl.
| | |
|---|---|
| F16L 9/00 | (2006.01) |
| B21D 19/12 | (2006.01) |
| F16L 9/02 | (2006.01) |
| F16L 9/06 | (2006.01) |
| B21D 26/033 | (2011.01) |
| F16L 11/15 | (2006.01) |
| F16L 33/30 | (2006.01) |
| F16L 21/03 | (2006.01) |

(52) U.S. Cl.
CPC ................ F16L 9/00 (2013.01); B21D 19/12 (2013.01); B21D 26/033 (2013.01); F16L 9/02 (2013.01); F16L 9/06 (2013.01); F16L 11/15 (2013.01); F16L 21/03 (2013.01); F16L 33/30 (2013.01)

(58) Field of Classification Search
CPC .... B21D 41/025; B21D 41/021; B21D 19/16; B21D 39/04; B21D 39/046; B21C 37/15; F16L 19/04; F16L 19/0286; F16L 19/028
USPC ........ 138/109, 172; 285/334.5; 72/360, 316, 72/386, 317
See application file for complete search history.

(56) References Cited

U.S. PATENT DOCUMENTS

| | | | | |
|---|---|---|---|---|
| 572,076 | A | 11/1896 | Smith | |
| 922,417 | A * | 5/1909 | Glauber | .......................... 57/216 |
| 1,658,100 | A * | 2/1928 | Rijns | ....................... F16L 13/02 285/288.1 |
| 3,263,476 | A * | 8/1966 | Hinderer | .............. B21D 41/025 72/360 |
| 5,354,107 | A * | 10/1994 | Takikawa | ............ F16L 19/0225 285/328 |
| 5,489,127 | A * | 2/1996 | Anglin | ................ F16L 19/0225 285/328 |
| 5,529,349 | A * | 6/1996 | Gibbs | ..................... F16L 19/02 285/332 |
| 8,172,278 | B2 * | 5/2012 | Abbott | ................ F16L 19/0286 285/384 |

(Continued)

FOREIGN PATENT DOCUMENTS

| | | |
|---|---|---|
| EP | 0 922 510 A1 | 6/1999 |
| FR | 663947 A | 8/1929 |

*Primary Examiner* — Patrick F Brinson
(74) *Attorney, Agent, or Firm* — Oliff PLC

(57) ABSTRACT

A thin wall pipe for fluid transfer including a body having a thin wall, a first end configured to be connected with another pipe or tube or element for fluid transfer, wherein the first end of the pipe includes a hem which is at least double folded so that the pipe end has a triple thickness.

9 Claims, 2 Drawing Sheets

(56) References Cited

U.S. PATENT DOCUMENTS

Figure 1:
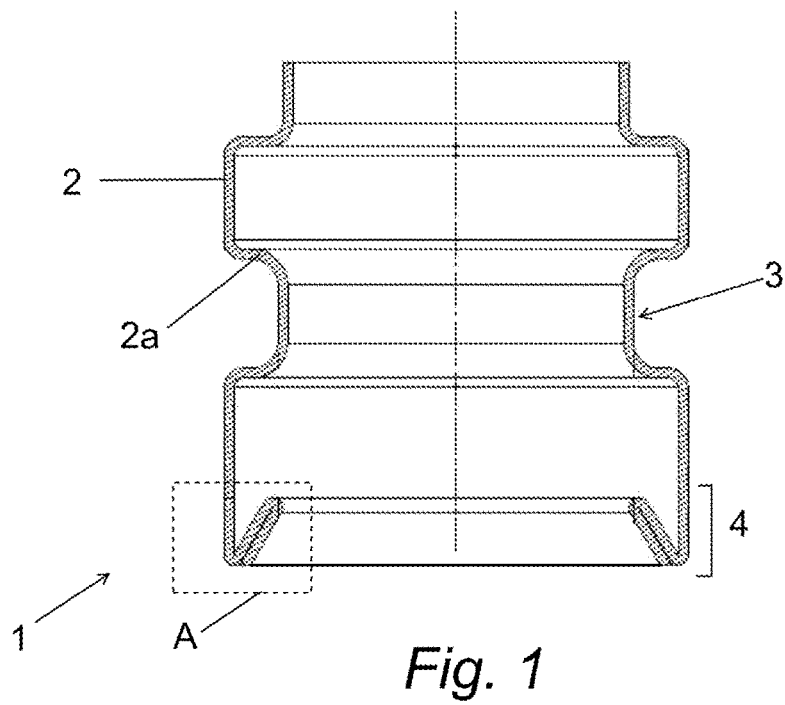

| | | | | |
|---|---|---|---|---|
| 8,292,334 | B2 * | 10/2012 | Knight | F16L 19/0225 |
| | | | | 285/382.4 |
| 9,492,860 | B2 * | 11/2016 | Tanaka | B21D 19/10 |
| 2014/0070527 | A1 * | 3/2014 | Bauerdick | F16L 9/17 |
| | | | | 285/111 |
| 2016/0084415 | A1 | 3/2016 | Kirkpatrick | |
| 2016/0201841 | A1 * | 7/2016 | Heutchy | F16L 19/0243 |
| | | | | 285/55 |

* cited by examiner

THIN WALL PIPE AND MANUFACTURING PROCESS

The invention relates to thin wall metal pipes for automotive fluid transfer and whose ends are made preferentially by hydroforming process but not necessarily. In the present invention, the hydroforming process consists of a forming operation supported with high inner pressure.

The ends of existing thin wall pipes are generally sharp, which cause regularly cuts on operators' fingers. Moreover, these ends are thin, and therefore are easily deformed and/or bent in handling or transport.

In this patent application, it is understood that "thin wall pipe" means pipe comprising a wall whose ratio between wall's thickness and outer diameter is strictly inferior to ⅟₂₅; Usually, thin wall metal pipes for automotive fluid transfer comprise a wall thickness between 0.3 to 0.5 mm for an outer diameter of 14 to 35.

In order to reinforce the end and try to avoid deformations of the end, the pipe end is folded up one time inside the pipe end. This configuration has the disadvantage of being not enough resistant to deformation forces.

Moreover, pipes made by hydroforming process are requiring a certain extra length outside the hydro-formed length. The pipe end is trimmed or cut to be as short as possible after the hydroforming operation. The disadvantage of this end is that it is sticking out 2-3 mm anyway and it is sharp as a knife and very easily deformed in handling and transport. Furthermore, Pipe with extra length cannot be used for special drainage requirement on oil drain pipes for turbo application.

Based on the above, the aim of the invention is to provide a reinforced thin wall pipe end to withstand handling without deformation and also hide and/or smoothen sharp edge.

For this purpose, the object of the invention is a thin wall pipe for fluid transfer comprising a body having a thin wall; a first end configured to be connected with another pipe or tube or element for fluid transfer, characterised in that the first end of the pipe comprises a hem which is at least double folded so that the pipe end has a triple thickness.

Thanks to this invention, the sharp part of the pipe end caused by the manufacturing process of the pipe end, is hidden inside the pipe and the triple thickness of the pipe end is more resistant to mechanical efforts applied on it.

Advantageously, the thin wall pipe can be connected to an element for transfer of fluid which can be for example, a seat in engine block or a turbo housing, or other parts of the engine or other parts were there is need to connect a thin wall pipe.

According to a feature of the invention, the cross-section of the end is globally trapezoidal or flared compared to the main body of the pipe.

According to a feature of the invention, the double folding of the end hem consists in a first folded part oriented inward the pipe and in a second folded part on the first folded part and oriented outward the pipe.

According to a feature of the invention, the second folded part comprises a sharp part, which is positioned inside the pipe.

According to a feature of the invention, the second folded part is recessed inside the pipe or flush at the pipe end.

According to a feature of the invention, the first folded part and the second folded part are in contact with each other.

According to a feature of the invention, the first folded part and the second folded part are distant from the thin wall of the pipe, forming an angle with the thin wall. Alternately, the hem is being completely folded flat to the inner surface of the pipe and there is no distance between the thin wall and both folded part.

According to a feature of the invention, the pipe comprises a circumferential recess shaped to house a seal ring, for example an O-ring.

According to a feature of the invention, the pipe end is formed by hydroforming process.

According to a feature of the invention, the circumferential recess is arranged upstream the pipe end on the body of the pipe.

According to a feature of the invention, the second folded part can be trimmed or dulled by a forming tool.

Another object of the invention is a manufacturing process of a thin wall pipe according to the invention, the process comprising the following steps:

Forming with internal pressure an expanded pipe preferentially equipped with a circumferential recess intended to house a seal ring, Cutting residual pipe length except for some length needed for holding during cutting, Forcing the pipe end in to the pipe and at the same time folding up twice the hem of the pipe end in order to obtain three layers of thickness.

According to a feature of the invention, the forming step is realized by a forming tool and preferentially by hydroforming.

According to a feature of the invention, the forcing step is realized by a punching operation According to the invention, the same process can be done on other thin wall applications were a reinforced pipe end is requested for improved part function or rigidity.

Figure 2:
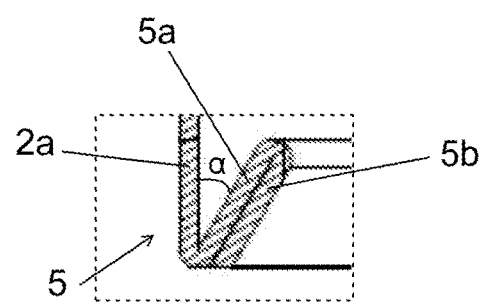
Figure 3:
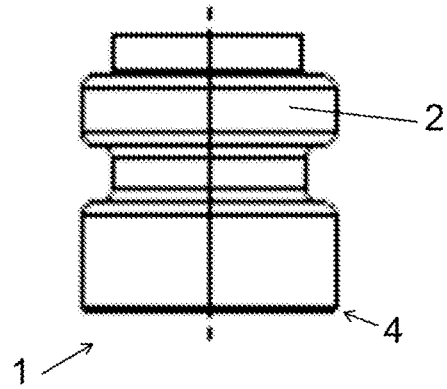
Figure 4:
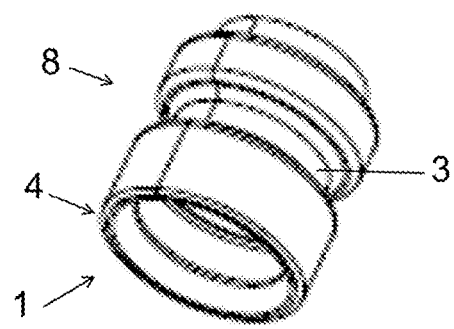
Figure 5:
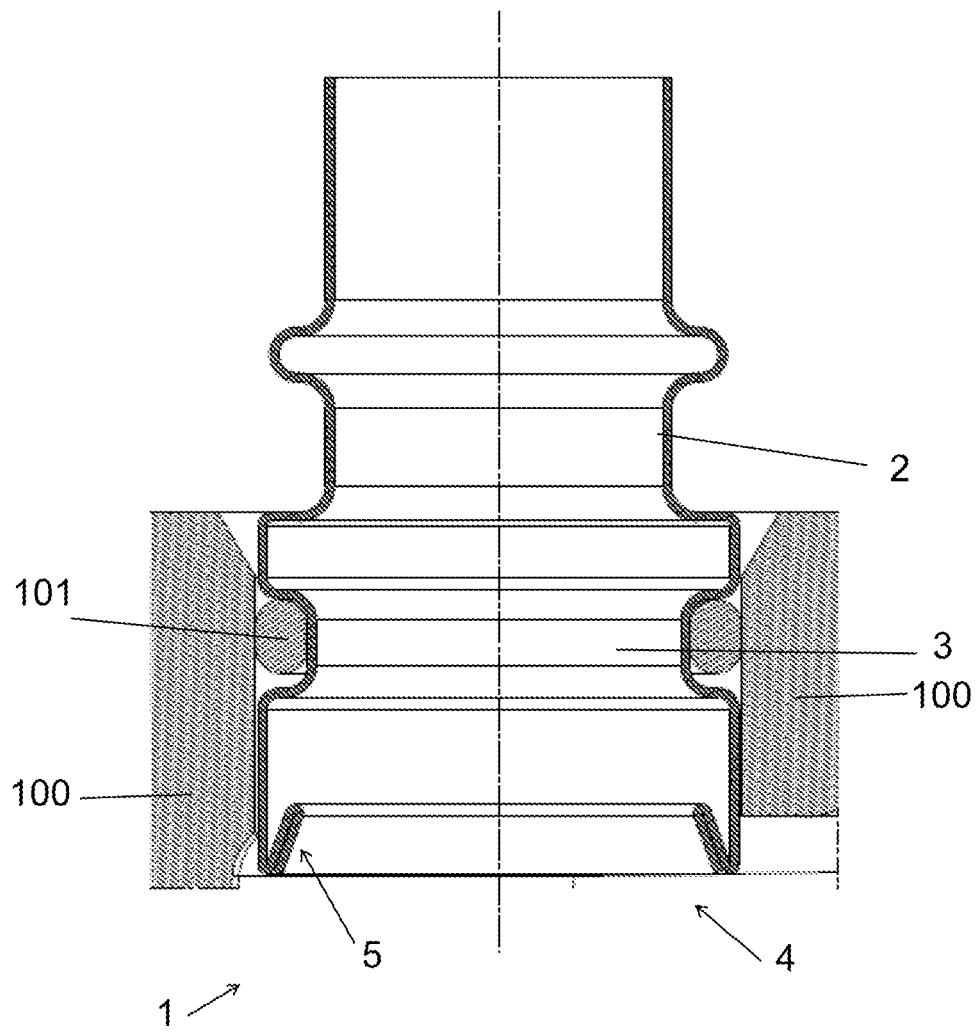

The invention will be better-understood thanks to the detailed specification hereinafter, which describes several embodiments of the invention as examples and based on the following figures:

FIG. 1 is a cross-sectional view of the thin wall pipe according to the invention, FIG. 2 is a detail according to the box A in FIG. 1 and illustrating the folded end of the pipe according to the invention, FIG. 3 is a side view of the thin wall pipe according to the invention, FIG. 4 is a perspective view of the thin wall pipe according to the invention, FIG. 5 is a cross-sectional view of the thin wall pipe according to the invention connected to another element for fluid transfer.

According to the invention, and as illustrated in FIGS. 1, 3 to 5 the thin wall pipe 1 comprises a body 2 having a thin wall 2a and a first end 4 configured to be connected with another pipe or tube or element for fluid transfer 100 as illustrated in FIG. 5.

As illustrated in FIG. 1 and with more details in FIG. 2, the first end 4 of the pipe 1 comprises a hem 5, which is at least double folded so that the pipe end 4 has a triple thickness. More particularly, the double folding consists in a first folded part 5a oriented inward the pipe 1 and in a second folded part 5b on the first folded part 5a and oriented outward the pipe 1.

As seen in FIG. 2, the first folded part 5a and the second folded part 5b are in contact with each other. Moreover, the first folded part 5a and the second folded part 5b are distant from the thin wall 2a of the pipe 1, forming an angle α with the thin wall 2a.

In a variant not represented, when angle α is in the vicinity of 0°, the first folded part 5a and the second folded part 5b are in contact with the thin wall 2a of the pipe 1.

As it can be seen in FIG. 1, the cross-section of the end is globally trapezoidal or flared compared to the body 2 of the pipe 1.

As illustrated in FIGS. 1, 3, and 4, the pipe 1 comprises a circumferential recess 3 arranged upstream the pipe end 4 on the body 2 of the pipe 1 and shaped to house a seal ring 101, for example an O-ring.

The thin wall pipe 1 illustrated in this example is formed by a hydroforming process and the second folded part 5b can be trimmed or dulled by a forming tool.

The pipe is made of metal, like steel, copper or aluminium, and alloys based on these materials, like, for example, stainless steel.

Obviously, the invention is not limited to the embodiments described and represented with the annexed figures. Modifications remain possible, in particular from the point of view of the constitution of each element or by substitution of technical equivalents, without leaving for all that the scope of the invention.

The invention claimed is:

1. Thin wall pipe for fluid transfer comprising:
    a body having a thin wall,
    a first end configured to be connected with another pipe or tube or element for fluid transfer,
    wherein the first end of the pipe comprises a hem which is at least double folded so that the pipe end has a triple thickness
    wherein the double folding of the end hem consists in a first folded part oriented inward the pipe and in a second folded part on the first folded part and oriented outward the pipe, and
    wherein the first folded part and the second folded part are distant from the thin wall of the pipe, forming an angle (α) with the thin wall.

2. Thin wall pipe according to claim 1, wherein the cross-section of the end is globally trapezoidal or flared compared to the body of the pipe.

3. Thin wall pipe according to claim 1, the first folded part and the second folded part are in contact with each other.

4. Thin wall pipe according to claim 1, the second folded part can be trimmed or dulled by a forming tool.

5. Thin wall pipe according to claim 1, the pipe comprises a circumferential recess shaped to house a seal ring.

6. Manufacturing process of a thin wall pipe according to claim 1, wherein the process comprises the following steps:
    forming with internal pressure an expanded pipe equipped with a circumferential recess intended to house a seal ring;
    cutting residual pipe length except for some length needed for holding during cutting; and
    forcing the pipe end in to the pipe and at the same time folding up twice the hem of the pipe end in order to obtain three layers of thickness.

7. Manufacturing process according to claim 6, wherein the forming step is realized by a forming tool and by hydroforming.

8. Manufacturing process according to claim 6, wherein the forcing step is realized by a punching operation.

9. Thin wall pipe according to claim 5, wherein the seal ring is an O-ring.

* * * * *